United States Patent [19]
Song

[11] Patent Number: 6,097,378
[45] Date of Patent: Aug. 1, 2000

[54] VIDEO DISPLAY APPARATUS WITH AUDIO CIRCUITRY AND A METHOD FOR CONTROLLING POWER THEREIN

[75] Inventor: Moon-Jong Song, Suwon, Rep. of Korea

[73] Assignee: SamSung Electronics Co., Ltd., Suwon, Rep. of Korea

[21] Appl. No.: 08/899,385

[22] Filed: Jul. 23, 1997

[30] Foreign Application Priority Data

Jul. 23, 1996 [KR] Rep. of Korea ...................... 96-29792

[51] Int. Cl.[7] ........................................ G09G 5/00
[52] U.S. Cl. .................... 345/211; 345/210; 345/212; 345/213
[58] Field of Search .................................. 345/204, 210, 345/211, 212, 213, 214; 381/110, 120, 123; 348/632, 633, 729, 730; 358/189, 190; 713/320, 323, 324

[56] References Cited

U.S. PATENT DOCUMENTS

| | | | |
|---|---|---|---|
| 5,396,635 | 3/1995 | Fung | 395/800 |
| 5,428,790 | 6/1995 | Harper et al. | 395/750 |
| 5,440,351 | 8/1995 | Ixhino | 348/729 |
| 5,579,029 | 11/1996 | Arai et al. | 345/213 |
| 5,586,333 | 12/1996 | Choi et al. | 395/750 |
| 5,616,988 | 4/1997 | Kim | 345/211 |
| 5,648,799 | 7/1997 | Kikinis | 345/212 |
| 5,721,936 | 2/1998 | Kikinis et al. | 713/324 |
| 5,787,297 | 7/1998 | Lin | 713/324 |

*Primary Examiner*—Vijay Shankar
*Attorney, Agent, or Firm*—Robert E. Bushnell, Esq.

[57] ABSTRACT

In one arrangement of a video display apparatus according to the present invention, an audio power supply, which separated from a constant voltage generator, is directly connected to a main power supply and supplies power to an audio circuit. A microcontroller generates an audio power control signal in response to key input data entered from a key input unit. An audio power controller is provided to shut off the audio power supplied to the audio circuit in response to the audio power control signal from the microcontroller. In another arrangement, the audio power supply is connected to an auxiliary power supply for supplying power to the microcontroller. Thus, the supplying of the audio power to the audio circuit can be controlled independent of the video circuitry and in accordance with user's need.

9 Claims, 8 Drawing Sheets

VIDEO DISPLAY APPARATUS WITH AUDIO CIRCUITRY AND A METHOD FOR CONTROLLING POWER THEREIN

CLAIM OF PRIORITY

This application makes reference to, incorporates the same herein, and claims all benefits accruing under 35 U.S.C §119 from an application entitled A Video Display Apparatus With Audio Circuitry And A Method For Controlling Power Therein earlier filed in the Korean Industrial Property Office on Jul. 23, 1996, and there duly assigned Ser. No. 96-29792 by that Office.

FIELD OF THE INVENTION

The present invention generally relates to a video display apparatus, more particularly to a video display apparatus having an audio circuit for processing audio signals applied from either a host, a microphone, or the both, and to a method for controlling power supplied to the audio circuit.

BACKGROUND OF THE INVENTION

Generally, power supplies for display apparatus such as cathode ray tube (CRT) display monitor apparatuses commonly used with computer systems are designed to provide the necessary voltages and currents within the desired specifications using internal control. As for a video display apparatus, typically, the power supply system thereof is provided with a power-off circuit for interrupting the electrical power supply to the display apparatus during a power off state.

In a video display apparatus having audio circuitry, video power savings for video circuitry are achieved by display power management signaling (DPMS) control recommended by video electronics standard association (VESA). It is well known that the DPMS power supply modes may be classified into a normal mode, a standby mode, a suspend mode and a power-off mode. Power management in a computer is described in, for example, U.S. Pat. No. 5,586,333 to Chun-Geun Choi, et al., entitled, Method And Control Apparatus For General Power Management Signal Of Computer Peripheral Equipment In A Compute System, U.S. Pat. No. 5,428,790 to Leroy D. Harper, et al., entitled, Computer Power Management System, and U.S. Pat. No. 5,396,635 to Henry T. Fung, entitled, Power Conservation Apparatus Having Multiple Power Reduction Levels Dependent Upon The Activity Of the Computer System.

The DPMS power supply mode of the display apparatus is decided by the horizontal and vertical synchronizing signals and video signals supplied from a host (i.e., personal computer) supporting the video power savings. If all the synchronizing and video signals are supplied from the host, the display apparatus is operated in the normal power supply mode. When the vertical synchronizing signal only is fed from the host, the power supply mode of the apparatus becomes the standby mode, in which various circuits are put into a reduced power state. When only the horizontal synchronizing signal is supplied from the host, the display apparatus is put into the suspend mode. Then, the power to the audio circuitry is shut off so that the audio circuitry cannot be operated. When none of the synchronizing and video signals are provided from the host, the display apparatus is put into the power-off mode. In such a case, the power to the audio circuitry is also shut off.

However, if the video display apparatus is operated in power saving modes, particularly in the suspend and power-off modes, there may arise a drawback that the power supplied to the audio circuit is shut off without regard to user's will. Consequently, the operation of the audio circuit depends on the power supply modes of the display apparatus.

SUMMARY OF THE INVENTION

It is therefore an object of the present invention to provide a video display apparatus having an audio circuit, in which the power savings for the audio circuit are achieved independent of video power savings for video circuitry.

It is another object of the present invention to provide a method for controlling the audio power supplied to the audio circuit of a video display apparatus independent of video power savings for video circuitry.

In order to attain the above objects, according to an aspect of the present invention, there is provided a video display apparatus performing power savings in response to horizontal and vertical synchronizing signals and video signals supplied from a host supporting the power savings, the apparatus comprising: a main power supply for supplying main power; a constant voltage generator for generating a constant voltage necessary for oscillator circuitry and RGB video amplifier circuitry by means of the main power; an auxiliary power supply for supplying auxiliary power; a microcontroller capable of operating by means of the auxiliary power, for generating first and second power control signals through first and second output ports thereof, respectively, in response to the horizontal and vertical synchronizing signals and the video signals from the host, and generating a third power control signal through a third output port thereof in response to key input data entered from a key input unit; a first power mode controller for shutting off the constant voltage supplied from the constant voltage generator to the oscillator and RGB video amplifier circuitry in response to the first power control signal; a second power mode controller for shutting off the main power supplied to the constant voltage generator in response to the second power control signal; an audio power supply for supplying audio power by means of the main power; an audio circuit capable of operating by means of the audio power; and an audio power controller for shutting off the audio power supplied to the audio circuit in response to the third power control signal.

In the video display apparatus, the audio power supply may supply the audio power to the audio circuit by using the auxiliary power.

According to still another aspect of the present invention, there is provided a method for controlling power in a video display apparatus which has an audio circuit and performs video power savings for video circuitry in response to horizontal and vertical synchronizing signals and video signals supplied from a host supporting the video power savings, the method comprising the steps of: determining whether there is a request for changing preset states of flags associated with audio power savings for the audio circuit; changing the states of the flags when the changing of the audio power saving states is required; determining whether at least one of the flags is changed; determining whether an audio operation flag, indicative of either enabling the audio circuit to be operated or not, is set to an active state when the at least one of the flags is changed; supplying the audio power to the audio circuit when the audio operation flag is set to the active state; setting an audio power state flag, indicative of either supplying the audio power to the audio circuit or not, to the active state; controlling the audio power savings in accordance with either the preset states or the changed states of the flags, independent of the video power savings; shutting off the audio power to the audio circuit when the audio operation flag is set to an inactive state; and setting the audio power state flag is set to the inactive state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
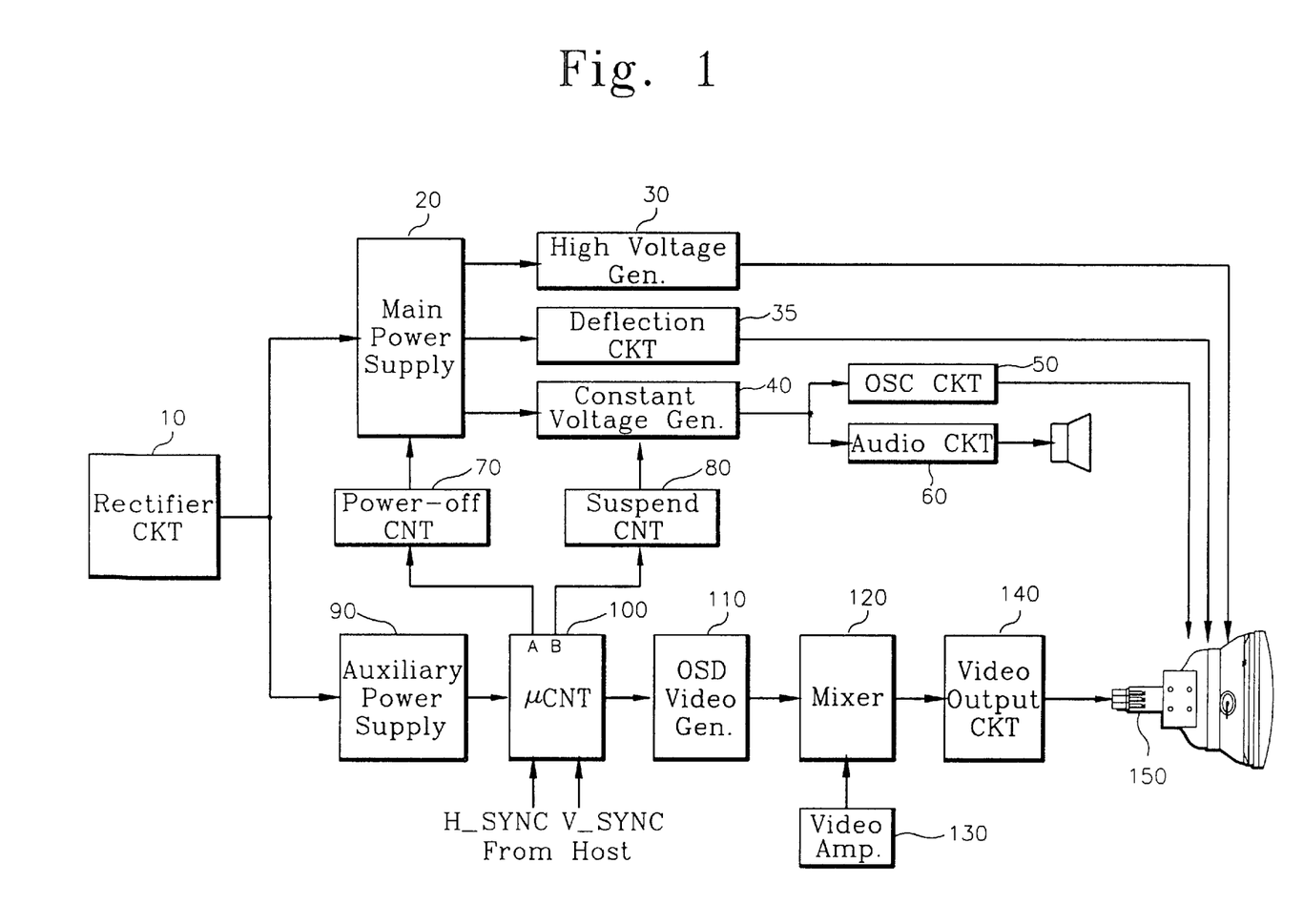
FIG. 1 is a block diagram illustrating an exemplary video display apparatus having a CRT and an audio circuit.

Referring to drawings and particularly to FIG. 1, which illustrates an exemplary video display apparatus having audio circuitry, this video display apparatus includes a fullwave rectifier circuit 10, a main power supply 20, a high voltage generator 30, deflection circuitry 35, a constant voltage generator 40, oscillation circuitry 50, an audio circuit 60. The video display apparatus performs video power savings for video circuitry in response to horizontal and vertical synchronizing signals and video signals supplied from a host (i.e., personal computer) supporting the video power savings.

Main power supply 20 supplies various voltages necessary for high voltage generator 30, deflection circuitry 35, constant voltage generator 40, etc. High voltage generator 30 applies high voltages to a cathode ray tube (CRT) 150. Deflection circuitry 35 deflects electron beams radiated from electron guns of CRT 150 in horizontal and vertical directions. Constant voltage generator 40 supplies a constant voltage necessary for amplifications and various oscillations of audio and video signals. Thus, oscillation circuitry 50 and audio circuit 60 are connected to constant voltage generator 40.

The video display apparatus further includes an auxiliary power supply 90, a microcontroller 100, a power-off controller 70, and a suspend controller 80. These controllers 100, 70 and 80 function as a circuit for controlling a display power management signaling (DPMS) power supply modes in response to information from a host. These will be described in detail below.

The DPMS power supply modes registered by the video electronics standard association (VESA) may be, as well-known in this art, classified into a normal mode, a standby mode, a suspend mode and a power-off mode. According to this DPMS system, power consumption of a 20 inch display apparatus is about 130 Watts during normal mode, about 30 Watts during suspend mode, below 8 Watts during power-off mode.

Referring back to FIG. 1, auxiliary power supply 90 is provided for supplying a constant DC voltage (e.g., 5 volts) to microcontroller 100 always, regardless of the DPMS power control. Microcontroller 100 receives the horizontal and vertical synchronizing signals H_SYNC and V_SYNC from a host (i.e., a personal computer) and key input data from a key input unit (not shown), and generates power control signals PSSA and PSSB through output ports A and B thereof. Microcontroller 100 controls the power savings related with video circuitry by means of the synchronizing signals H_SYNC and V_SYNC and RGB video signals from the host.

If all the synchronizing and video signals are inputted from the host, microcontroller 100 recognizes current power control mode as normal state. In such a case none of the power control signals PSSA and PSSB is generated from microcontroller 100. Thus, main power supply 20 and constant voltage generator 40 are operated in the normal state.

When the vertical synchronizing signal V_SYNC only is inputted from the host, microcontroller 100 recognizes the current power control mode as the standby state. In this state, various circuits are put into a reduced power state.

When only the horizontal synchronizing signal H_SYNC is inputted from the host, microcontroller 100 recognizes the current power control mode as the suspend state. The power control signal PSSB then is generated from microcontroller 100 so that constant voltage generator 40 is disabled by suspend controller 80. This results in shutting off the power supplied from constant voltage generator 40 to oscillation circuitry 50 and audio circuit 60.

When none of the synchronizing and video signals are fed from the host, microcontroller 100 recognizes the current power control mode as the power-off state. In that case, the power control signal PSSA is generated from microcontroller 100 so that main power supply 40 is disabled by power-off controller 70. Therefore, high voltage generator 30, deflection circuitry 35, constant voltage generator 40, oscillation circuitry 50, and audio circuit 60 all are powered off.

Microcontroller 100 also controls an on screen display (OSD) video generator 110 to generate OSD video signals when the key input data are entered from the key input unit in accordance with the control of user. A mixer 120 mixes the OSD video signals from OSD video generator 110 and the main video signals from host through video amplifier circuitry 130. These mixed video signals are provided to the electron guns of CRT 150 through a video output circuit 140.

As described above, the exemplary video display apparatus is provided with the audio circuit, which is connected to the constant voltage generator as shown in FIG. 1. Therefore, if the video display apparatus is operated in power saving modes, particularly in the suspend and power-off modes, there is a problem that the power supplied from the constant voltage generator to the audio circuit is shut off without regard to user's will. Consequently, the operation of the audio circuit depends on the power supply modes of the display apparatus.

Figure 2:
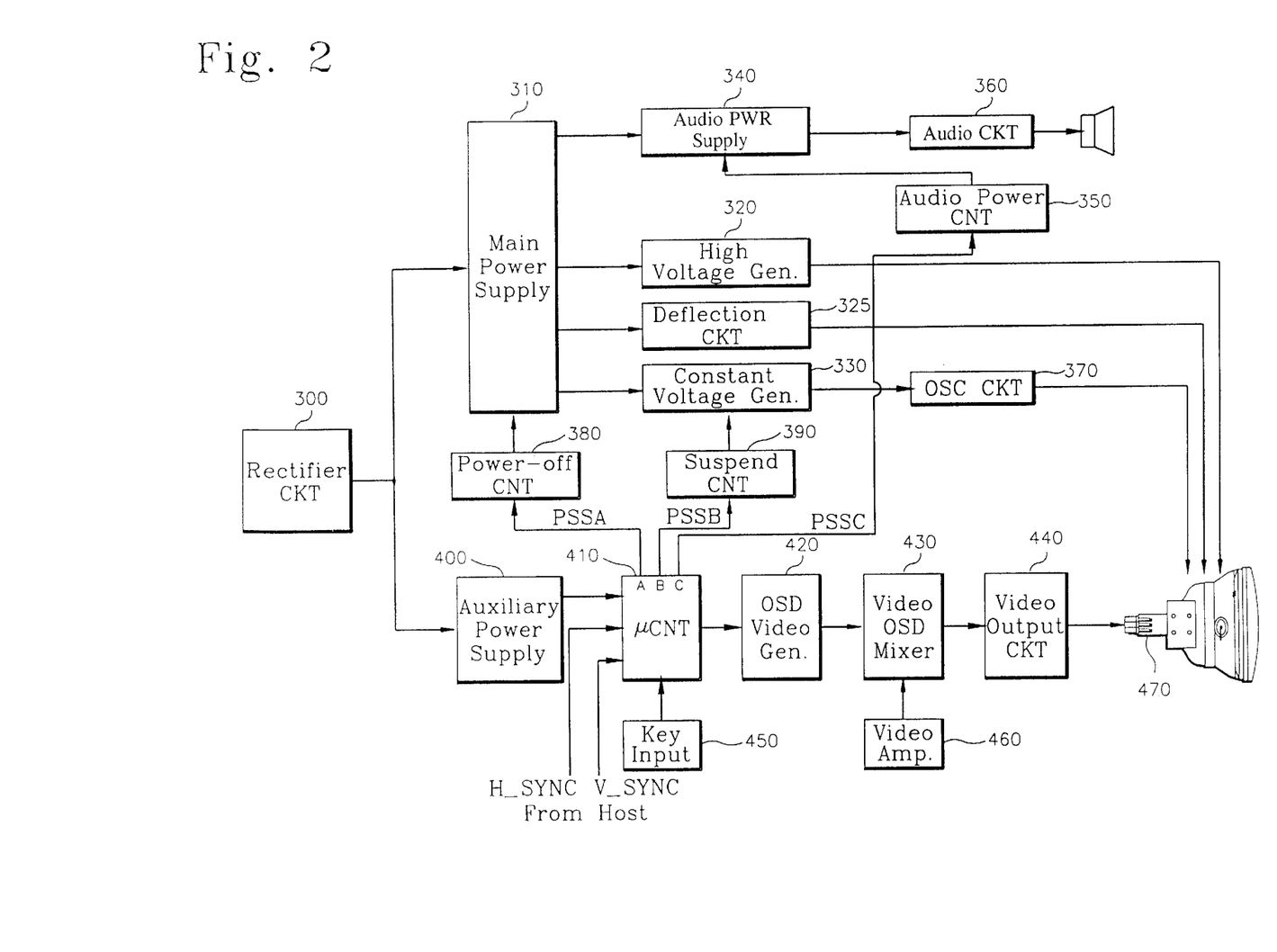
FIG. 2 is a block diagram illustrating a video display apparatus according to an embodiment of the present invention.

Referring now to FIG. 2, in a video display apparatus according to an embodiment of the present invention, an audio power supply 340, which separated from a constant voltage generator 330, is directly connected to a main power supply 310 and supplies power (referred to as audio power) to an audio circuit 360. A microcontroller 410 generates an audio power control signal PSSC in response to key input data entered from a key input unit 450. An audio power controller 350 is provided to shut off the audio power supplied to audio circuit 360 in response to the audio power control signal PSSC from microcontroller 410. Thus, in power saving modes with exception of power-off mode, the supplying of the audio power to the audio circuit can be controlled independent of the video circuitry and in accordance with user's will.

Turning to FIG. 2, a fullwave rectifier circuit 300 includes a bridge diode (not shown) which receives an AC voltage of 90 to 260 volts. A main power supply 310 has, as is well known, boost and switching transformers, a switching element, a pulse width modulation controller, and so on. Main power supply 310 supplies various voltages (e.g., 6, 14, 25, 30, 80, 200 volts, etc.) necessary for high voltage generator 320, deflection circuitry 325, constant voltage generator 330, etc. High voltage generator 320 provides high voltages (e.g., about 6 to 8 K volts) to a CRT 470. Deflection circuitry 325 deflects electron beams radiated from electron guns of CRT 470 in horizontal and vertical directions. Constant voltage generator 330 supplies a constant voltage (e.g., 12 volts) to oscillation circuitry 370 and a video amplifier circuitry 460. Oscillation circuitry 370, as is well-known, is made up of a high voltage oscillator, a deflection control oscillator, horizontal and vertical oscillators, etc.

The video display apparatus further includes an auxiliary power supply 400, a microcontroller 410, a power-off controller 380, a suspend controller 390, a key input unit 450, an OSD video generator 420, a mixer 430, video amplifier circuitry 460, and a video output circuit (or gun driver) 440. Auxiliary power supply 400 is provided for always supplying a constant DC voltage (e.g. 5 volts) to microcontroller 410, regardless of DPMS control. Microcontroller 410 receives horizontal and vertical synchronizing signals H_SYNC and V_SYNC from the host and key input data from key input unit 450, and generates power control signals PSSA, PSSB and PSSC through output ports A, B and C thereof. Microcontroller 410 also controls OSD video generator 420 to generate OSD video signals when the key input data are entered from key input unit 450 in accordance with user control. Mixer 430 mixes the OSD video signals from OSD video generator 420 and the main video signals from the host through video amplifier circuitry 460. These mixed video signals are provided to the electron guns of CRT 470 through a video output circuit 440.

The video display apparatus of this embodiment includes an audio power supply 340. In this apparatus, controllers 350, 380, 390 and 410 function as a circuit for controlling display power management signaling (DPMS) power supply modes and audio power supply modes in response to information from a host and a key input unit. These will be described in detail below.

Audio power supply 340 is directly connected to main power supply 310 so as to supply the audio power to audio circuit 360 independent of constant voltage generator 330. As aforementioned, microcontroller 410 controls the power supply modes associated with video circuitry (referred to as video power savings) by means of the synchronizing signals H_SYNC and V_SYNC and main video signals from the host. On the other hand, microcontroller 410 controls the power savings related with audio circuitry (referred to as audio power savings) by the use of the key input data from key input unit 450. This audio power supply modes which are achieved by the circuitry shown in FIG. 2 will be described in detail hereinbelow, with reference to FIGS. 2 through 5.

For instance, it is assumed that a user sets the audio power saving mode of the display apparatus to the power-off mode. In this case, even if only the horizontal synchronizing signal H_SYNC is inputted from the host, that is, though the video power supply mode of the display apparatus becomes the suspend mode, the audio power control signal PSSC remains in inactive state, the same as the normal mode. Audio circuit 360 is thus provided with the audio power from audio power supply 340. Namely, audio circuit 360 is normally operated regardless of the video power saving mode. In this case, the audio power is not supplied to audio circuit 360 until the display apparatus is put into the power-off mode.

For other instance, assuming that the audio power saving mode of the display apparatus is set to the standby mode, the audio power control signal PSSC becomes active when the display apparatus comes into the standby mode, as well as the suspend and power-off modes. At this time, audio power controller 350 shuts off the audio power to audio circuit 360 in response to the audio power control signal PSSC. In such a state, if the display apparatus comes back to the normal mode, audio power controller 350 enables the audio power to be supplied to audio circuit 360 again.

Figure 3:
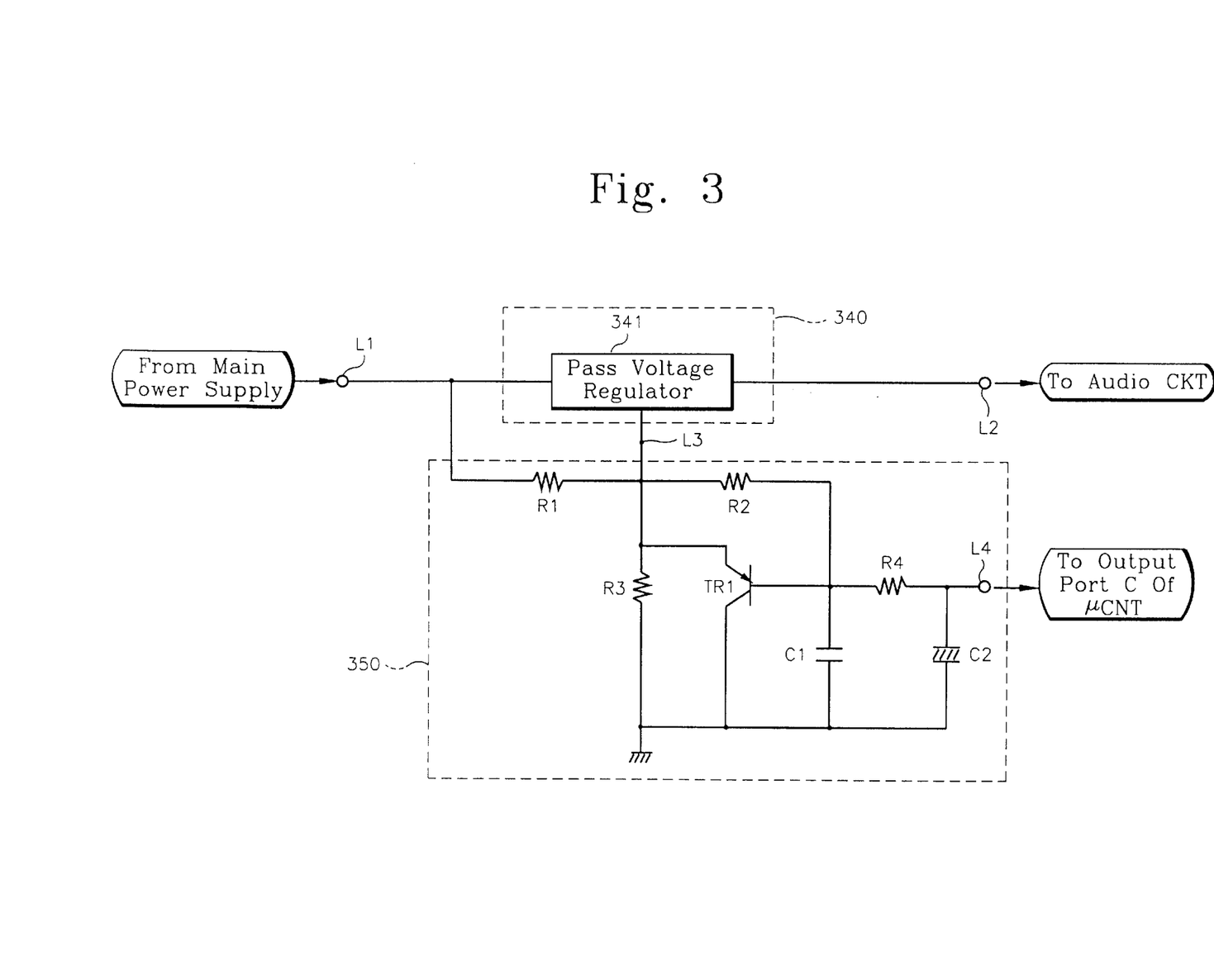
FIG. 3 is a circuit diagram showing the audio power supply and the audio power controller of FIG. 2.

Referring to FIG. 3, there is shown a circuit diagram of audio power supply 340 and audio power controller 350 of FIG. 2. As is shown, audio power supply 340 comprises a pass (or programmable) voltage regulator 341, which has an input terminal L1 connected to main power supply 310, an output terminal L2 connected to audio circuit 360, and a control terminal L3 connected to an output terminal of audio power controller 350. Audio power supply 340 supplies the audio power to audio circuit 360 and switching on/off in response to a switching control signal from audio power controller 350.

Audio power controller 350 comprises a PNP bipolar transistor TR1, resistors R1 to R4, and capacitors C1 and C2. The current path (i.e., emitter-collector path) of transistor TR1 is connected between control terminal L3 of pass voltage regulator 314 and a ground, a control terminal (i.e., base) thereof is connected to output port C of microcontroller 410 through resistor R4. Resistor R1 is connected between the input and control terminals L1 and L3 of pass voltage regulator 341. Resistor R2 is connected between control terminal L3 of pass voltage regulator 341 and the control terminal of transistor TR1. Resistor R3 is connected between control terminal L3 of pass voltage regulator 341 and the ground. One capacitor C1 is connected between the control terminal of transistor TR1 and the ground, the other capacitor C2 between output port C of microcontroller 410 and the ground.

When input terminal L4 of audio power controller 350 is fed with the power control signal PSSC of low level, transistor TR1 is turned on so that regulator 341 is switched on. Thus, the audio power from audio power supply 340 is supplied to audio circuit 360. On the other hand, when input terminal L4 of audio power controller 351 is fed with the power control signal PSSC of high level, transistor TR1 is turned off so that regulator 341 is switched off As a result, the audio power from audio power supply 340 to audio circuit 360 is shut off.

In this embodiment, the audio power supplying is controlled by microcontroller 410, independent of the video power supply modes (i.e., standby, suspend and power-off modes). Thus, even though the display apparatus is put into either the standby mode or the suspend mode, audio circuit 360 can be operated regardless of the power mode. According to this embodiment, in the other power saving modes but the power-off mode, the supplying of the audio power to the audio circuit can be controlled independent of the video circuitry and in accordance with user's will.

Figure 4:
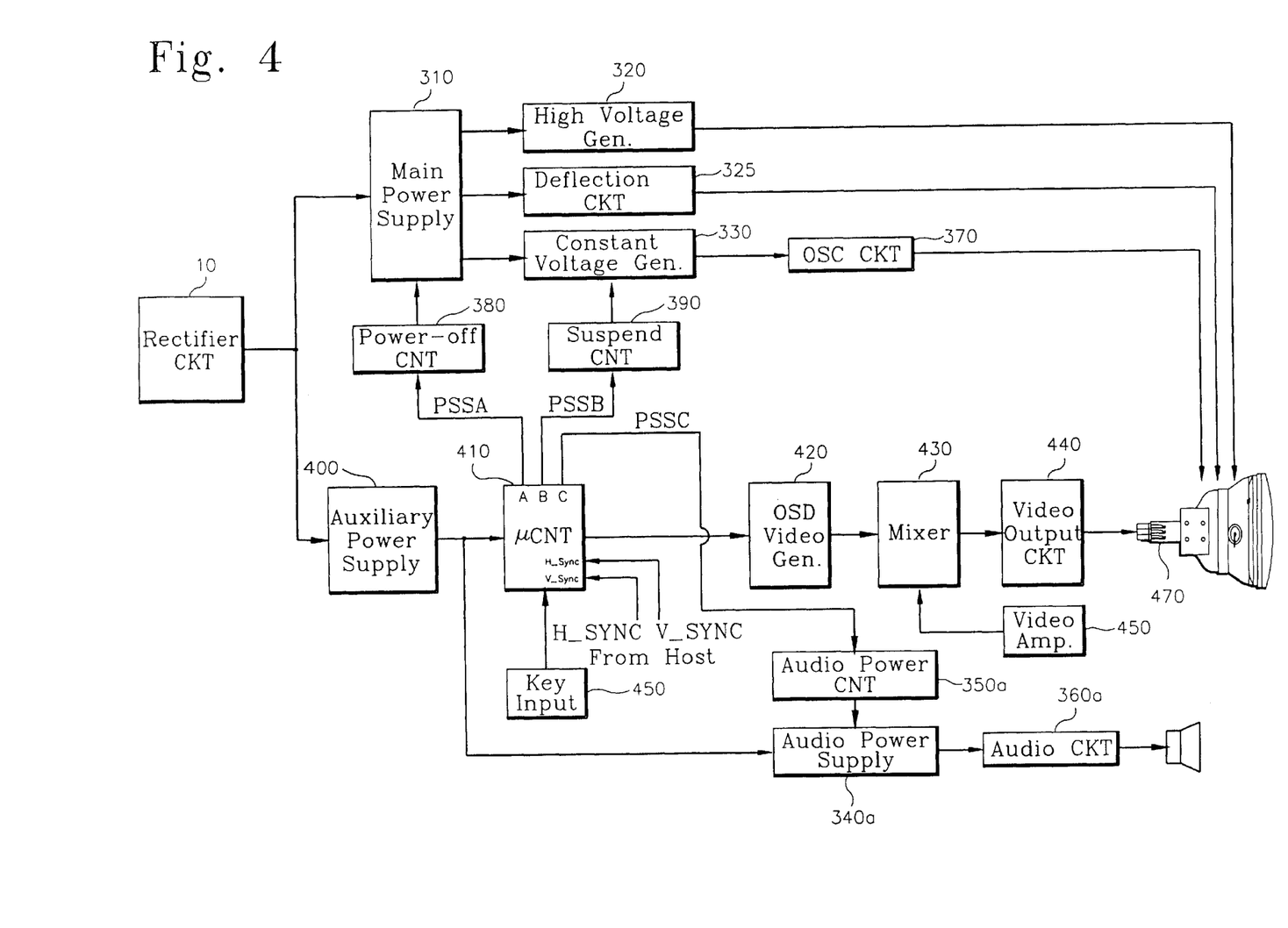
FIG. 4 is a block diagram illustrating a video display apparatus according to another embodiment of the present invention.

Referring to FIG. 4, there is illustrated another embodiment of the present invention. In FIG. 4, the same units as those shown in FIG. 2 are denoted by the same reference numerals and are not described in detail below.

In this embodiment, an audio power supply 340a is directly connected to auxiliary power supply 400 and supplies audio power to an audio circuit 360a. Microcontroller 410 also generates the audio power control signal PSSC in response to the key input data entered from key input unit 450. An audio power controller 350a is provided to cut off the audio power supplied to audio circuit 360a in response to the audio power control signal PSSC from microcontroller 410. Thus, even though the display apparatus is put into any power saving mode, audio circuit 360a can be operated regardless of the power mode and in accordance with user's need when there is no request for the audio power savings.

Audio power supply 340a and audio power controller 350a have the same configurations shown in FIG. 3, except for the fact that input terminal L1 of regulator 341 is connected to auxiliary power supply 400 instead of main power supply 310.

Hereinafter, a method for controlling the audio power supplied to audio circuit 360 or 360a will be described with reference to FIGS. 5A through 5D. Control program for performing the method is executed by means of micrcocontroller 410 in the video display apparatus according to the present invention. In the color CRT display apparatus of FIGS. 2 or 4, a user can control the audio power to audio circuit 360 or 360a can be controlled independent of the video circuitry and in accordance with his will.

Figure 5A:
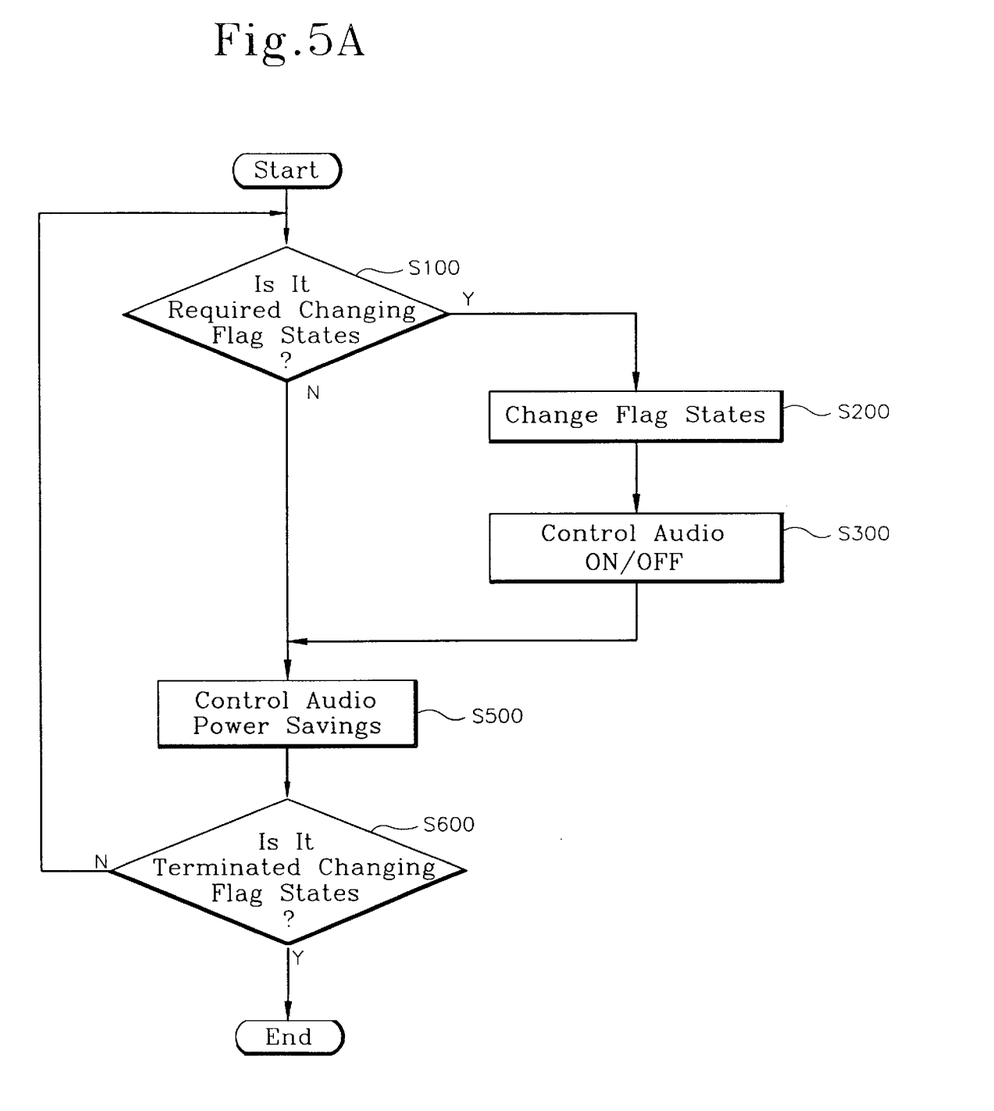
FIG. 5A is a flowchart illustrating a novel method for controlling power supplied to the audio circuit in accordance with the present invention.

Referring to FIG. 5A, first, in step S100, it is determined whether or not a user requests the preset states of flags associated with audio power savings to be changed by means of a key input unit of the display apparatus. If so, at step S100, the control then proceeds to step S200. In the step S200, the states of the flags are changed in accordance with the flag state change routine shown in FIG. 5B.

Figure 5B:
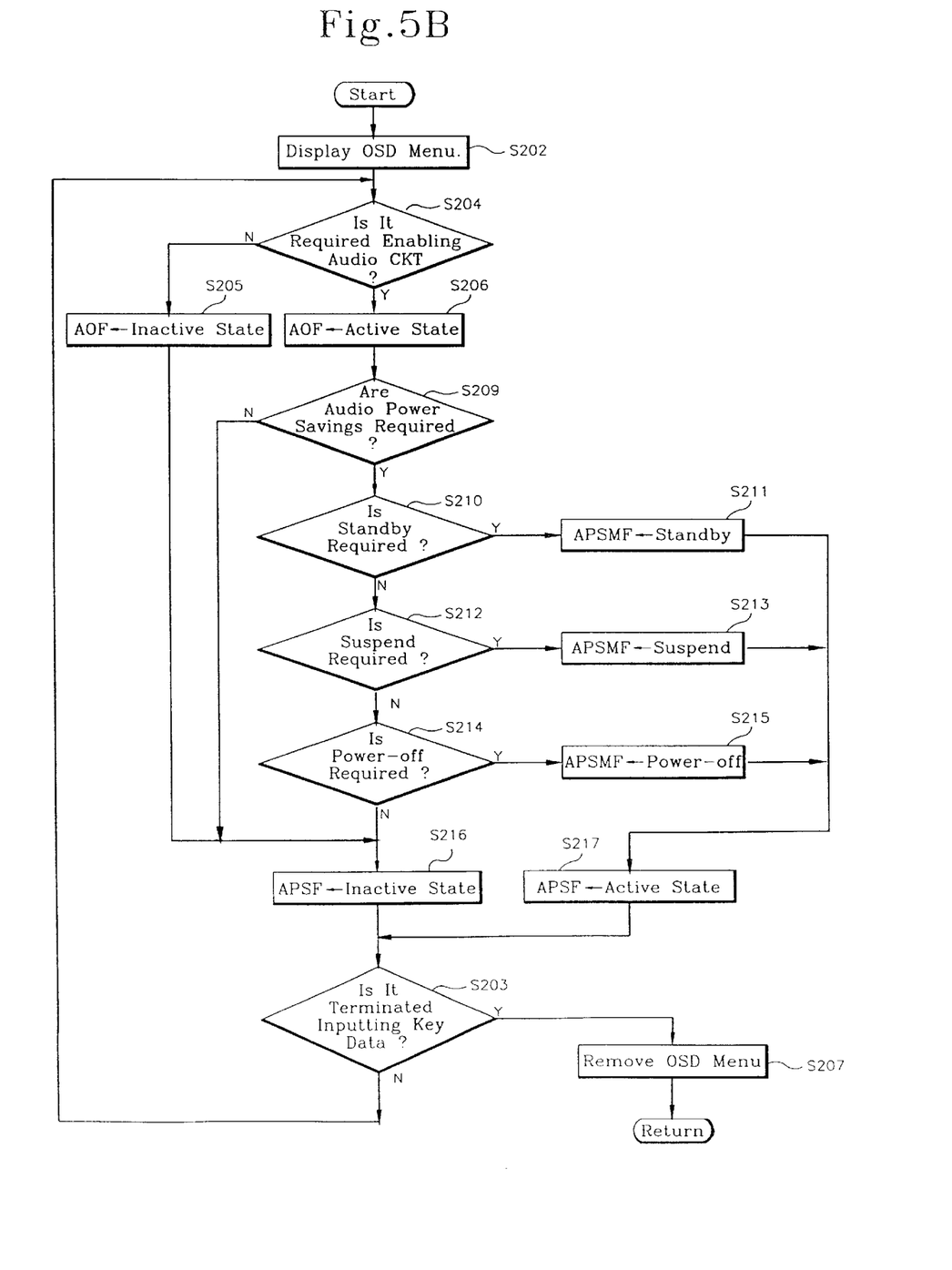
FIG. 5B is a flowchart illustrating the flag state change routine shown in FIG. 5A.

Referring to 5B, at step S202, an OSD menu associated with audio power saving mode change is displayed on a screen of the display apparatus. The control then proceeds to step S204, wherein it is determined whether the audio circuit is required to be operated or not. If not, at step S204, the control proceeds to step S205 wherein an audio operation flag (AOF), indicative of either enabling the audio circuit to be operated or not, is set to the inactive state. Thereafter, an audio power saving flag (APSF), indicative of either performing the audio power savings or not, is set to the inactive state in step S216.

In step S204, if the audio circuit is required to be operated, the audio operation flag (AOF) is set to the active state. The control proceeds to step S209, wherein it is determined whether or not there is a request for the audio power savings. If so, at steps S209 to S215, an audio power saving mode flag (APSMF) is set to one of the stand-by, suspend and power-off states.

To put it concretely, in step S210, it is determined whether or not the audio standby mode is required. If so, the audio power saving mode flag (APSMF) is set to the standby state in step S211, if not, it is determined whether or not the audio suspend mode is required in step S212. If so, in step S212, the control proceeds to the step S213 wherein the audio power saving mode flag (APSMF) is set to the suspend state. If not, in step S212, the control then proceeds to step S214 wherein it is determined whether or not there is a request for the audio power-off mode. If so at step S214, the control flow proceeds to step S215 wherein the audio power saving mode flag (APSMF) is set to the power-off state. Following any of steps S211, S213 and S215, the control proceeds to step S217. In step S217, the audio power saving flag (APSF) is set to the active state.

Meanwhile, if there is no request for the audio power-off mode in S214, the control proceeds to step S216, wherein the audio power saving flag (APSF) is set to the inactive state.

Thereafter, in step S203, it is determined whether or not the inputting of key data from the key input unit is terminated. If so, the control proceeds to step S207 so as to remove the OSD menu from the CRT screen and then the control returns to step S300 of FIG. 5A, if not, the control returns to step S204.

Turning back to FIG. 5A, after the above-mentioned flag state change routine is completed, the control proceeds to step S300. In step S300, the audio ON/OFF control routine, as shown in FIG. 5C, is executed.

Figure 5C:
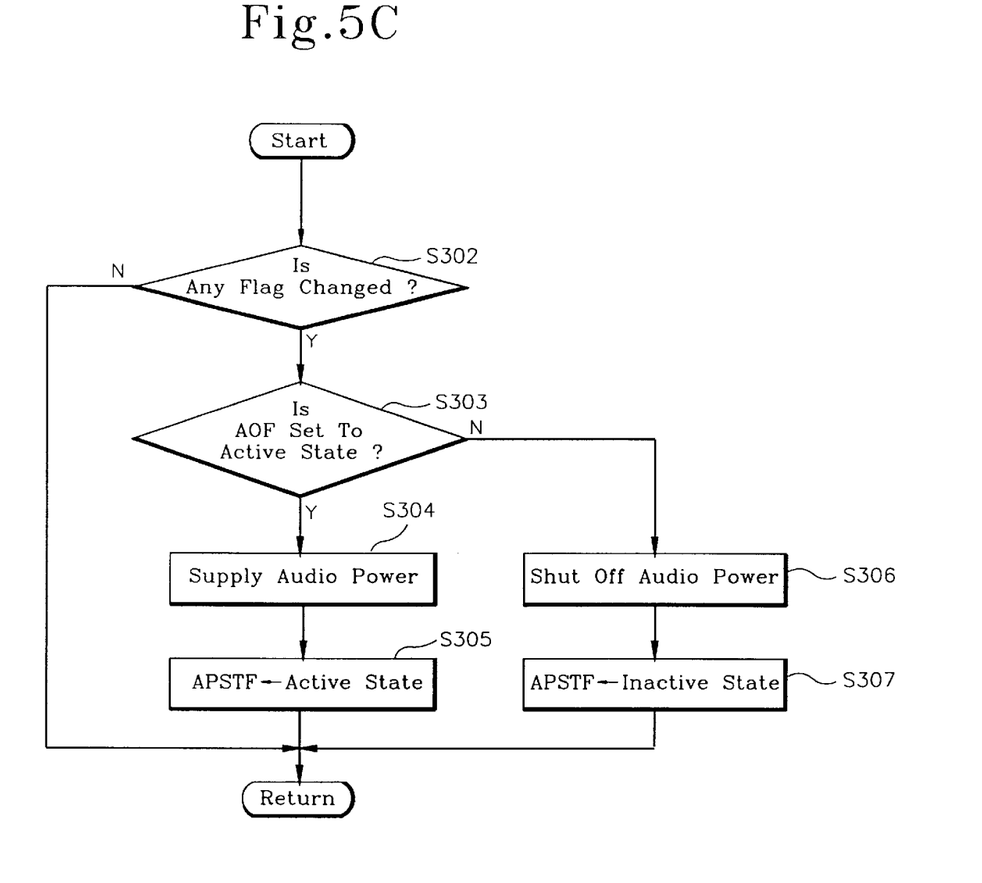
FIG. 5C is a flowchart illustrating the audio ON/OFF control routine shown in FIG. 5A.

Referring to FIG. 5C, at step S302, it is determined whether or not at least one of the flags is changed. If so, in step S302, the control then proceeds to step S303 wherein it is determined whether the audio operation flag (AOF) is set to the active state. If so, in step S303, the audio circuit is supplied with the audio power from the audio power supply in step S304. The control then proceeds to step S305 wherein the audio power state flag (APSTF) is set to the active state. Thereafter, the control returns to step S500 of FIG. 5A.

On the other hand, if the audio operation flag (AOF) is not set to the active state in step S303 of FIG. 5C, the supply of the audio power to the audio circuit is shut off in step S306. Subsequently, the control proceeds to step S307 wherein the audio power state flag (APSTF) is set to the inactive state, and then the control jumps to step S500 of FIG. 5A.

Figure 5D:
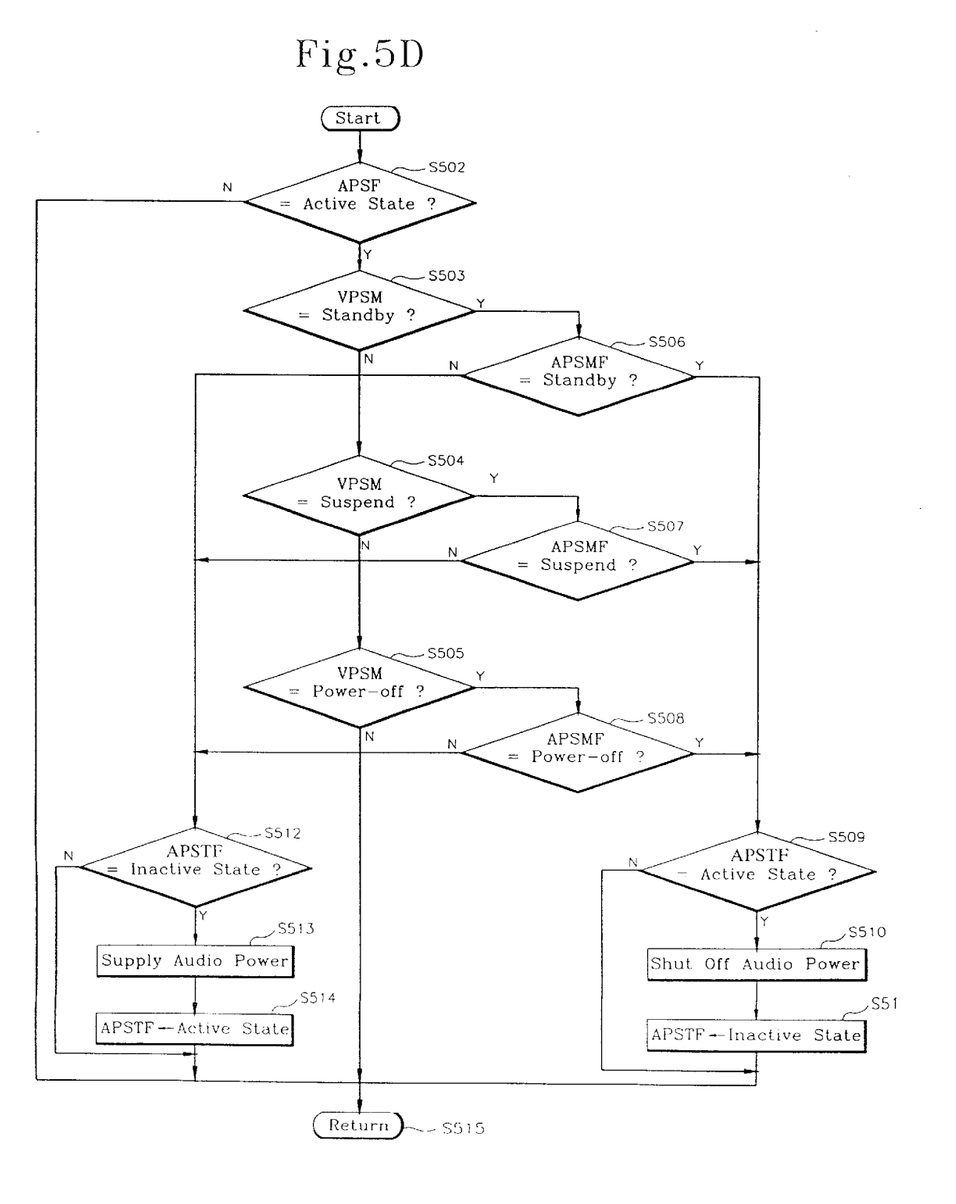
FIG. 5D is a flowchart illustrating the audio power saving control routine shown in FIG. 5A.

Turning back to FIG. 5A, after the above-mentioned audio ON/OFF control routine is completed, or if the determination made in step S100 is negative, the control proceeds to step S500. In step S500, the audio power saving control routine, as shown in FIG. 5D, is executed. By means of the audio power saving control routine, the audio power savings can be controlled in accordance with either the preset states or the changed states of the flags and independent of the video power savings.

Referring to FIG. 5D, in step S502, it is determined whether or not the audio power saving flag (APSF) is set to the active state. If so, the control proceeds to step S503 wherein it is determined whether or not a video power saving mode (VPSM) is at the stand-by state. In step S503, if so, the control flow proceeds to step S506, wherein it is determined whether or not the audio power saving mode flag (APSMF) is set to the stand-by state. If so, at step S506, it determined whether or not the audio power state flag (APSTF) is set the active state in step S509. In step S509, if so, the control proceeds through step S510 to step S511 so that the audio power to the audio circuit is shut off and the audio power state flag (APSTF) is set to the inactive state, respectively. Thereafter, or if if thew result of step S509 is negative, the control proceeds to step S515 which is a jump, or return, to step S600 of FIG. 5A.

Meanwhile, in step S506, if the audio power saving mode flag (APSMF) is not set to the stand-by state, it is determined whether or not the audio power state flag (APSTF) is set to the inactive state in step S512. If so, the control proceeds through step S513 to step S514 so that the audio power is supplied to the audio circuit and the audio power state flag (APSTF) is set to the active state, respectively. Thereafter, or if the result of step S512 is negative, the control proceeds to the step S600 of FIG. 5A via return step S515.

In step S503, if the video power saving mode (VPSM) is not at the stand-by state, it is determined whether the video power saving mode (VPSM) is at the suspend state in step S504. If so, the control proceeds to step S507 wherein it determined whether or not the audio power saving mode flag (APSMF) is set to the suspend state. If so, as determined in step S507, the control proceeds to the step S509, if not, the control proceeds to the step S512.

In step S504, if the video power saving mode (VPSM) is not at the suspend state, it is determined whether the video power saving mode (VPSM) is at the power-off state in step S505. If so, the control proceeds to step S508 wherein it determined whether or not the audio power saving mode flag (APSMF) is set to the power-off state. If so, as determined in step S508, the control proceeds to the step S509, if not, the control proceeds to the step S512.

In step S505, if the video power saving mode (VPSM) is not at the power-off state, the control proceeds to the step S600 of FIG. 5A via return step S515.

As shown in FIG. 5A, in step S600, it is determined whether or not the process for changing flag states is terminated. If so, the control is terminated, if not the control returns to step S100.

According to the present invention, even though the display apparatus is put into any power saving mode, the audio circuit 360 can be operated regardless of the power mode and in accordance with user's need.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A video display apparatus performing power savings in response to horizontal and vertical synchronizing signals and video signals supplied from a host supporting the power savings, the apparatus comprising:
    means for supplying first power;
    means for generating a constant voltage by means of the first power;
    means for supplying second power;
    a microcontroller capable of operating by means of the second power, for generating first and second power control signals through first and second output ports thereof, respectively, in response to the horizontal and vertical synchronizing signals and the video signals, and generating a third power control signal through a third output port thereof in response to key input data entered from a key input unit;
    means for shutting off the constant voltage in response to the first power control signal;
    means for shutting off the first power in response to the second power control signal;
    means for supplying third power by means of the first power;
    means capable of operating by means of the third power, for processing audio signal from the host; and
    means for shutting off the third power in response to the third power control signal, whereby the supplying of the third power to the audio processing means is controlled independent of the video circuitry.

2. The video display apparatus according to claim 1, wherein the third power supplying means comprises:
    a pass voltage regulator having an input terminal connected to the second power supplying means;
    an output terminal connected to the audio circuit; and
    a control terminal connected to the third power shutting means, for supplying or shutting off the third power to the audio processing means in response to a switching control signal from the third power shutting-off means.

3. The video display apparatus according to claim 2, wherein the third power shutting off means comprises:
    a transistor having a current path connected between the control terminal of the pass voltage regulator and a ground, and a control terminal;
    a first resistor connected between the input and control terminals of the pass voltage regulator;
    a second resistor connected between the control terminal of the pass voltage regulator and the control terminal of the transistor;
    a third resistor connected between the control terminal of the pass voltage regulator and the ground;
    a fourth resistor connected between the control terminal of the transistor and the third output port of the microcontroller;
    a first capacitor connected between the control terminal of the transistor and the ground; and
    a second capacitor connected between the third output port of microcontroller and the ground.

4. A video display apparatus performing power savings in response to horizontal and vertical synchronizing signals and video signals supplied from a host supporting the power savings, the apparatus comprising:
    a main power supply for supplying main power;
    a constant voltage generator for generating a constant voltage necessary for oscillator circuitry and RGB video amplifier circuitry by means of the main power;
    an auxiliary power supply for supplying auxiliary power;
    a microcontroller capable of operating by means of the auxiliary power, for generating first and second power control signals through first and second output ports thereof, respectively, in response to the horizontal and vertical synchronizing signals and the video signals from the host, and generating a third power control signal through a third output port thereof in response to key input data entered from a key input unit;
    a first power mode controller for shutting off the constant voltage supplied from the constant voltage generator to the oscillator and RGB video amplifier circuitry in response to the first power control signal;
    a second power mode controller for shutting off the main power supplied to the constant voltage generator in response to the second power control signal;
    an audio power supply for supplying audio power by means of either the main power or the auxiliary power;
    an audio circuit capable of operating by means of the audio power; and
    an audio power controller for shutting off the audio power supplied to the audio circuit in response to the third power control signal.

5. The video display apparatus according to claim 4, wherein the audio power supply comprises;
   a pass voltage regulator having an input terminal connected to the main power supply;
   an output terminal connected to the audio circuit; and
   a control terminal connected to the audio power controller, for supplying and shutting off the audio power to the audio circuit in response to a switching control signal from the audio power controller.

6. The video display apparatus according to claim 5, wherein the audio power controller comprises:
   a transistor having a current path connected between the control terminal of the pass voltage regulator and a ground, and a control terminal;
   a first resistor connected between the input and control terminals of the pass voltage regulator;
   a second resistor connected between the control terminal of the pass voltage regulator and the control terminal of the transistor;
   a third resistor connected between the control terminal of the pass voltage regulator and the ground;
   a fourth resistor connected between the control terminal of the transistor and the third output port of the microcontroller;
   a first capacitor connected between the control terminal of the transistor and the ground; and
   a second capacitor connected between the third output port of microcontroller and the ground.

7. A method for controlling power in a video display apparatus which has an audio circuit and performs video power savings for video circuitry in response to horizontal and vertical synchronizing, signals and video signals supplied from a host supporting the video power savings, the method comprising the steps of:
   determining whether there is a request for changing preset states of flags associated with audio power savings for the audio circuit;
   changing the states of the flags when the changing of the audio power saving states is required;
   determining whether at least one of the flags is changed;
   determining whether an audio operation flag, indicative of either enabling the audio circuit to be operated or not, is set to an active state when the at least one of the flags is changed;
   supplying the audio power to the audio circuit when the audio operation flag is set to the active state;
   setting an audio power state flag, indicative of either supplying the audio power to the audio circuit or not, to the active state;
   controlling the audio power savings in accordance with either the preset states or the changed states of the flags, independent of the video power savings;
   shutting off the audio power to the audio circuit when the audio operation flag is set to an inactive state; and
   setting the audio power state flag is set to the inactive state.

8. The method of claim 7, wherein the step of changing the state of the flags comprises the steps of:
   displaying an on screen display menu on a screen of the display apparatus;
   determining whether there is a request for enabling the audio circuit to be operated;
   setting the audio operation flag to the inactive state when the enabling of the audio circuit is not required;
   setting an audio power saving flag, indicative of either performing the audio power savings or not, to the inactive state;
   setting the audio operation flag to the active state when the enabling of the audio circuit is required;
   determining whether there is a request for the audio power savings;
   setting an audio power saving mode flag to one of stand-by, suspend and power-off states when the audio power savings are required; and
   setting the audio power saving flag to the active state.

9. The method of claim 8, wherein the step of controlling the audio power savings in accordance with either the preset states or the changed states of the flags comprises the steps of:
   determining whether the audio power saving flag is set to the active state;
   determining whether a video power saving mode is at the stand-by state when the audio power saving flag is set to the active stage;
   determining whether the audio power saving mode flag is set to the stand-by state when the video power saving mode is at the stand-by state;
   determining whether the audio power state flag is set the active state when the audio power saving mode flag is set to the stand-by state;
   shutting off the audio power to the audio circuit when the audio power state flag is set the active state;
   setting the audio power state flag to the inactive state;
   determining whether the audio power state flag is set the inactive state when the audio power saving mode flag is not set to the stand-by state;
   supplying the audio power to the audio circuit when the audio power state flag is set the inactive state;
   setting the audio power state flag to the active state;
   determining whether the video power saving mode is at the suspend state when the video power saving mode is not at the stand-by state;
   determining whether the audio power saving mode flag is set to the suspend state when the video power saving mode is at the suspend state;
   returning to the step of determining whether the audio power state flag is set the active state when the audio power saving mode flag is set to the suspend state;
   returning to the step of determining whether the audio power state flag is set the inactive state when the audio power saving mode flag is not set to the suspend state;
   determining whether the video power saving mode is at the power-off state when the video power saving mode is not at the suspend state;
   determining whether the audio power saving mode flag is set to the power-off state when the video power saving mode is at the power-off state;
   returning to the step of determining whether the audio power state flag is set the active state when the audio power saving mode flag is set to the power-off state; and
   returning to the step of determining whether the audio power state flag is set the inactive state when the audio power saving mode flag is not set to the power-off state.

* * * * *